United States Patent
Frields et al.

(10) Patent No.: US 8,843,832 B2
(45) Date of Patent: Sep. 23, 2014

(54) ARCHITECTURE, SYSTEM AND METHOD FOR A REAL-TIME COLLABORATION INTERFACE

(75) Inventors: Paul W. Frields, Fredericksburg, VA (US); Luke J. Macken, Westford, MA (US)

(73) Assignee: Reh Hat, Inc., Raleigh, NC (US)

( * ) Notice: Subject to any disclaimer, the term of this patent is extended or adjusted under 35 U.S.C. 154(b) by 616 days.

(21) Appl. No.: 12/842,689

(22) Filed: Jul. 23, 2010

(65) Prior Publication Data

US 2012/0023418 A1    Jan. 26, 2012

(51) Int. Cl.
| | | |
|---|---|---|
| *G06F 3/00* | (2006.01) | |
| *G06F 3/048* | (2013.01) | |
| *H04L 12/58* | (2006.01) | |
| *H04L 12/18* | (2006.01) | |
| *G06F 3/0481* | (2013.01) | |
| *G06Q 10/10* | (2012.01) | |
| *G06F 9/54* | (2006.01) | |
| *H04N 7/15* | (2006.01) | |

(52) U.S. Cl.
CPC ............ *G06Q 10/101* (2013.01); *H04L 12/581* (2013.01); *H04L 12/1822* (2013.01); *H04L 12/1813* (2013.01); *G06F 3/0481* (2013.01); *G06Q 10/109* (2013.01); *G06Q 10/107* (2013.01); *H04N 7/15* (2013.01); *G06F 9/542* (2013.01)
USPC ............ 715/756; 715/751; 715/753; 715/759

(58) Field of Classification Search
CPC .... G06Q 10/107; G06Q 1/109; H04L 12/581; H04L 12/1813; H04L 12/1822; H04N 7/15; G06F 3/0481; G06F 9/542
USPC .................................. 715/751, 753, 756, 759
See application file for complete search history.

(56) References Cited

U.S. PATENT DOCUMENTS

| | | | |
|---|---|---|---|
| 6,519,571 B1 | 2/2003 | Guheen et al. | |
| 6,826,595 B1 * | 11/2004 | Barbash et al. | ............... 709/204 |
| 6,856,970 B1 | 2/2005 | Campbell et al. | |
| 6,987,987 B1 | 1/2006 | Vacanti et al. | |
| 7,062,511 B1 * | 6/2006 | Poulsen | ............... 1/1 |
| 7,130,773 B1 | 10/2006 | Wong | |
| 7,321,883 B1 * | 1/2008 | Freedy et al. | ................... 706/45 |
| 8,136,148 B1 | 3/2012 | Chayanam et al. | |
| 2001/0037494 A1 * | 11/2001 | Levien et al. | ..................... 717/5 |
| 2002/0052954 A1 * | 5/2002 | Polizzi et al. | ................. 709/225 |
| 2002/0065038 A1 | 5/2002 | Nawata | |
| 2002/0109706 A1 | 8/2002 | Lincke et al. | |
| 2002/0129106 A1 * | 9/2002 | Gutfreund | ..................... 709/205 |
| 2002/0156693 A1 | 10/2002 | Stewart et al. | |

(Continued)

OTHER PUBLICATIONS

USPTO, Office Action for U.S. Appl. No. 12/626,464 mailed Dec. 6, 2012.

*Primary Examiner* — Tadeese Hailu
*Assistant Examiner* — Eric J Bycer
(74) *Attorney, Agent, or Firm* — Lowenstein Sandler LLP

(57) ABSTRACT

A method and apparatus for a real-time interface for collaborating between users is described. In one embodiment, the method includes receiving a request to initiate a collaboration on a particular subject. The method may also include selecting a collection of framework widgets based on the particular subject, each framework widget being a web-based component that is updated in real time. In one embodiment, the method may further include embedding the collection of framework widgets in a collaboration interface.

20 Claims, 9 Drawing Sheets

(56) References Cited

U.S. PATENT DOCUMENTS

| | | |
|---|---|---|
| 2003/0018951 A1 | 1/2003 | Srivastava et al. |
| 2003/0046282 A1* | 3/2003 | Carlson et al. ............ 707/6 |
| 2003/0084059 A1* | 5/2003 | Kelley et al. ............ 707/102 |
| 2004/0107249 A1* | 6/2004 | Moser et al. ............ 709/204 |
| 2005/0010877 A1* | 1/2005 | Udler ............ 715/826 |
| 2005/0138426 A1 | 6/2005 | Styslinger |
| 2005/0180352 A1 | 8/2005 | Gerovski et al. |
| 2005/0273499 A1* | 12/2005 | Goodman et al. ............ 709/206 |
| 2005/0278323 A1* | 12/2005 | Horvitz et al. ............ 707/5 |
| 2006/0005163 A1* | 1/2006 | Huesken et al. ............ 717/107 |
| 2006/0010390 A1* | 1/2006 | Guido et al. ............ 715/742 |
| 2006/0168522 A1* | 7/2006 | Bala ............ 715/712 |
| 2006/0200829 A1 | 9/2006 | Astl et al. |
| 2006/0209868 A1 | 9/2006 | Callaghan |
| 2007/0033571 A1* | 2/2007 | Moore et al. ............ 717/104 |
| 2007/0162501 A1* | 7/2007 | Agassi et al. ............ 707/104.1 |
| 2007/0162570 A1* | 7/2007 | Mathur et al. ............ 709/219 |
| 2007/0180227 A1 | 8/2007 | Akimoto |
| 2007/0198534 A1* | 8/2007 | Hon et al. ............ 707/10 |
| 2007/0250841 A1 | 10/2007 | Scahill et al. |
| 2008/0028323 A1* | 1/2008 | Rosen et al. ............ 715/752 |
| 2008/0082627 A1* | 4/2008 | Allen et al. ............ 709/217 |
| 2008/0091686 A1* | 4/2008 | Beard ............ 707/10 |
| 2008/0162848 A1 | 7/2008 | Broyles et al. |
| 2008/0235258 A1 | 9/2008 | Chung et al. |
| 2008/0250237 A1 | 10/2008 | Sebesta et al. |
| 2008/0285091 A1 | 11/2008 | Skaaksrud et al. |
| 2008/0288877 A1* | 11/2008 | Latzina et al. ............ 715/762 |
| 2008/0294751 A1* | 11/2008 | Dreiling ............ 709/219 |
| 2009/0055749 A1* | 2/2009 | Chatterjee et al. ............ 715/738 |
| 2009/0064247 A1 | 3/2009 | Biniak |
| 2009/0172565 A1 | 7/2009 | Jackson et al. |
| 2009/0249282 A1* | 10/2009 | Meijer et al. ............ 717/104 |
| 2009/0265355 A1 | 10/2009 | Chen et al. |
| 2010/0005450 A1 | 1/2010 | Joy et al. |
| 2010/0082659 A1* | 4/2010 | Reddy et al. ............ 707/767 |
| 2010/0146060 A1 | 6/2010 | Graham |
| 2010/0174577 A1 | 7/2010 | Duffy et al. |
| 2010/0332703 A1 | 12/2010 | Ejiri |

* cited by examiner

ARCHITECTURE, SYSTEM AND METHOD FOR A REAL-TIME COLLABORATION INTERFACE

TECHNICAL FIELD

Embodiments of the invention relate to the field of web applications, and more particularly, to a real-time interface for collaborating between users.

BACKGROUND

Information is commonly exchanged over the internet via web applications run in web browsers. The ease of such information exchange has led to the proliferation of online collaborations. Rudimentary online collaborations involved leaving an ongoing exchange of messages at messaging boards, simply posting data on different web pages, etc. These methods of collaboration, however, were not very collaborative.

Specialized collaboration systems were therefore developed to facilitate specific types of collaborations. For example, a document may be collaboratively edited by multiple users who check out a document from a store, edit the document, and check the edited document back into the store. Such systems, however, are run by proprietary applications that provide only a single type of collaboration on limited types of data. Furthermore, if a user desires to access information, statistics, or other data not provided by the collaboration system, the user must leave the collaboration. This diverts a users attention, refocuses them on another task, and otherwise removes the user from the flow of an ongoing collaboration.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus for a real-time interface for collaborating between users is described. In one embodiment, the method includes receiving a request to initiate a collaboration on a particular subject. The method may also include selecting a collection of framework widgets based on the particular subject, each framework widget being a web-based component that is updated in real time. In one embodiment, the method may further include embedding the collection of framework widgets in a collaboration interface.

Figure 1A:
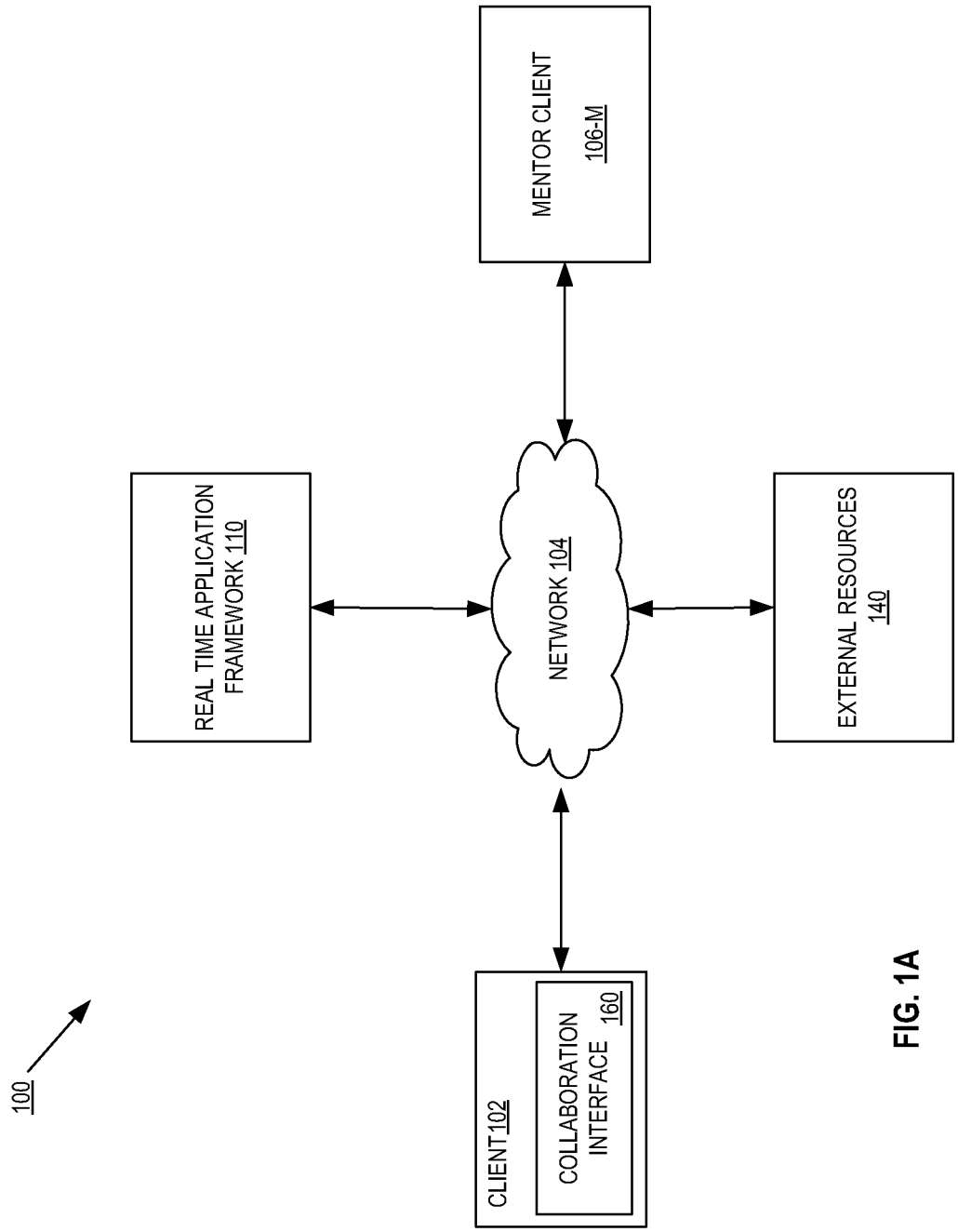
FIG. 1A is a block diagram of exemplary system architecture for providing a real-time collaboration interface.

FIG. 1A is a block diagram of exemplary system architecture 100 for providing a real-time collaboration interface. In one embodiment, the system includes a real time application framework 110, clients 102, and external resources 140. The framework 110, external resources 140, and clients 102 may be coupled to a computer network 104 that communicates via any of the standard protocols for the exchange of information.

In one embodiment, real time application framework 110 is responsible for creating and distributing real-time web applications embedded in web pages, and for creating an environment for application programmers to create web applications. In one embodiment, the real time web applications include collaboration interfaces 160 embedded with framework widgets provided to clients, such as client 102, from real time application framework 110. In one embodiment, a framework widget is a live web component that is updated in real time in response to receiving data messages, and processes the message in a collaboration interface 160 of client 102. In one embodiment, the updates correspond to topic subscriptions of the framework widgets for a particular collaboration. In one embodiment, a topic is an abstraction of a messaging queue or message broker, and thus a framework widget subscribes to receiving data messages from the corresponding message queue or message broker.

In one embodiment, a collaboration is a real-time interaction between client 102 and other mentor clients 106-M via collaboration interface 160. In one embodiment, collaboration interface 160 includes a collection of embedded framework widgets that provide different collaboration features, such as instant messaging, data feeds from technical journals, access to technical libraries, shared data entry or editing, etc. In one embodiment, mentor client 106-M may also interact with client 102 via a collaboration interface. However mentor client 106-M may also collaborate with client 102 via real-time communications channels not embedded in a collaboration interface, such as a standard chat client. As discussed herein, collaboration may include interactions between clients on a wide range of subjects such as creating software, debugging software, bug triage, commenting on political issues, editing documents, editing images, conducting functional testing, etc.

In one embodiment, the data messages for given topics are obtained from external resources 140, or other resources connected to the network 104, and are distributed by the real time application framework 100 to the framework widgets of collaboration interface 160 currently rendered in a web page displayed by client 102. In one embodiment, collaboration interface 160 is a web-based collaboration interface embedded in the web page displayed by client 102. In one embodiment, the data messages are provided to the framework widgets without the framework widgets, a web browser of the client, or the client itself, issuing requests, polling the real time application framework, or otherwise proactively seeking updated data.

In one embodiment, in order to receive an initial web page with collaboration interface 160, client 102 issues a request for a web page served by real time application framework 110. In one embodiment, the web page request is a standard hypertext transfer protocol (HTTP) request made to a web server of the real time application framework. In one embodiment, as discussed below, the request also includes data that indicates a user's area of interest, skill set, experience level, etc. for use in selecting a collaboration. In response to the request, real time application framework 110 responds with the requested web page, including a collaboration interface 160 that includes a collection of framework widgets selected based on the user's area of interest. In one embodiment, the web page includes the framework widgets for updating components of the collaboration interface 160 of the web page in real time.

In one embodiment, as the web page including the framework widgets is provided to the client 102, real time application framework 110 further opens a framework socket in client 102. In one embodiment, the framework socket is a live connection between the client and real time application framework 110. In one embodiment, the framework socket is referred to as live because the framework socket is persistently open while the web page is being displayed by client 102. Furthermore, the framework socket enables an open communications connection between client and real time application framework 110 through which different communications protocols, data messages, etc. may flow through. In one embodiment, the framework socket remains open to enable real time application framework 110 to provide data messages to framework widgets rendered in client 102 without receiving requests from the client and/or the framework widgets.

In one embodiment, real time application framework 110 obtains data in real time. In one embodiment, real time application framework 110 runs applications that poll external resources 140 over network 104 to determine if new and/or updated data is available at the external resources 104. In one embodiment, the applications are installed as plug-in applications on a server of the real time application framework 110. When new or updated data is available at the external resources 140 for framework widgets in collaboration interface 160, real time application framework 110 obtains the data for distribution to framework widgets in order to update a particular collaboration. In one embodiment, real time application framework 110 obtains the data from external resources 110 as the data becomes available in real time.

In one embodiment, after real time application framework 110 obtains the data, real time application framework 110 pushes the data to client 102. In one embodiment, real time application framework includes a message broker, discussed below, which determines which clients are to receive the data message. The message broker then routes the data messages to the appropriate clients. In one embodiment, real time application framework 110 pushes the data to the framework widgets rendered in clients 102 via the live framework socket. As discussed herein, the persistent connection between the framework socket and the real time application framework 110 enables the framework 110 to deliver updated data to the clients without the clients proactively seeking the data. In one embodiment, responsive to receiving the updated data, the framework widgets rendered in client 102 further process the message for updating and displaying the updated data in a web page or web application displayed in client 102.

In one embodiment, real time application framework 110 continues to obtain updated data and distribute the updates to clients 102 in real time as updated data becomes available. The framework widgets rendered in the clients 102 continue to update as new data messages are received. As a result, the interaction between the framework widgets rendered in clients 102 and the framework 110 enable the creation, distribution, and running of real time web applications.

Figure 1B:
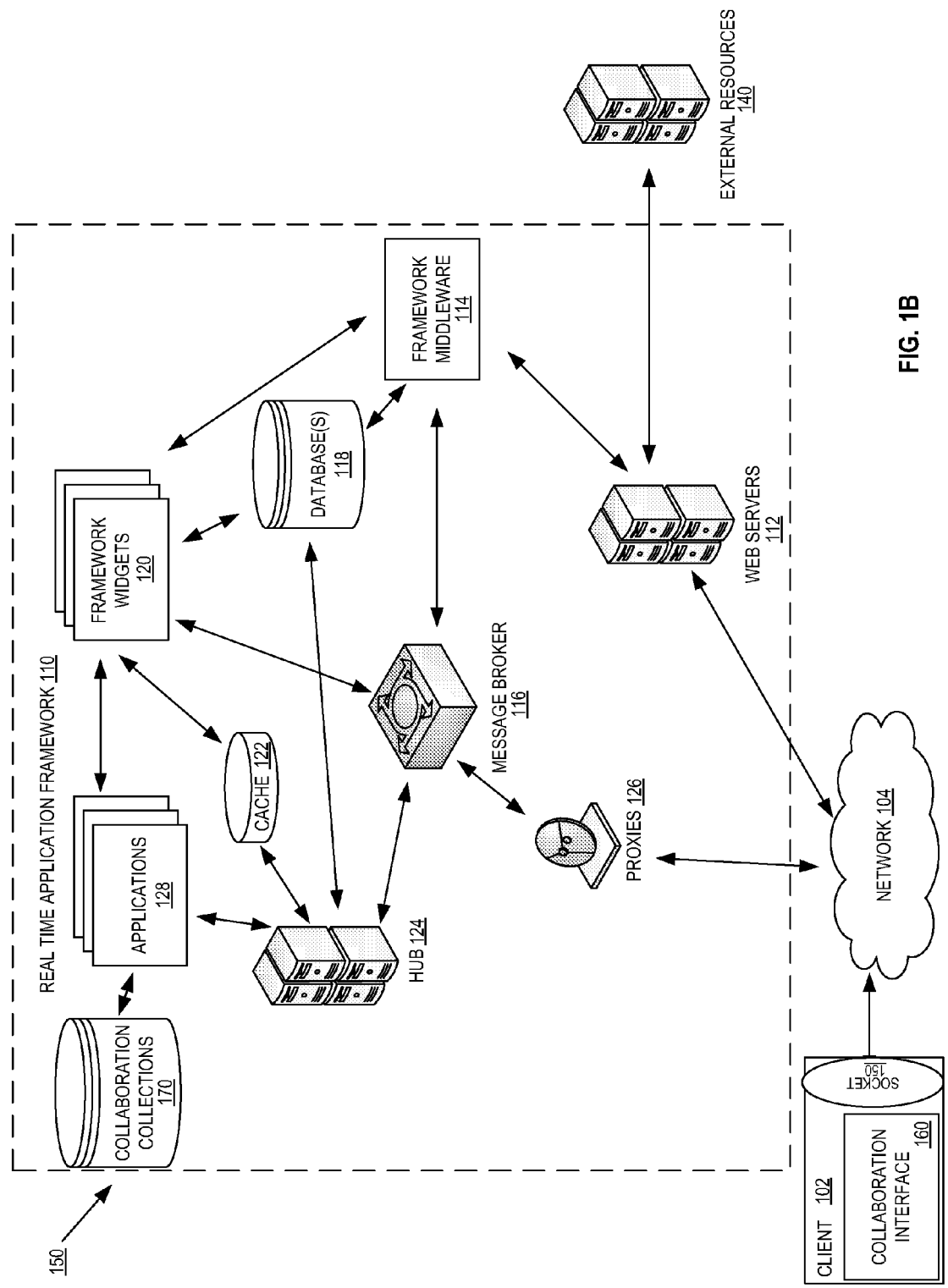
FIG. 1B is a block diagram of exemplary system architecture for providing real-time collaboration interfaces.

FIG. 1B is a block diagram of exemplary system architecture 150 for providing real-time collaboration interfaces. System architecture 150 illustrates additional details, according to the embodiments discussed below, for architecture 100 discussed above in FIG. 1.

In one embodiment, the system 150 includes a real-time web application framework 110, external resources 140, and a plurality of clients 102. The framework 110 and external resources 140 may reside on the same or different machines (e.g., a server computer system, a gateway, a personal computer, etc.). The framework 110, external resources 140, and clients 102 may be coupled to a computer network 104 that communicates via any of the standard protocols for the exchange of information. They may run on one Local Area Network (LAN) and may be incorporated into the same physical or logical system, or different physical or logical systems.

Alternatively, the framework 110, external resources 140, and clients 102 may reside on different LANs that may be coupled together via the Internet but separated by firewalls, routers, and/or other network devices. In yet another configuration, the framework 110 and external resources 140 may reside on a server, or different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, clients 102 are user computer systems that run standard web browsers for accessing the framework 110 as well as non-framework resources over the internet to obtain, run, and interact with a collaboration interface 160. The computer systems may run any web browser, such as FIREFOX™, INTERNET EXPLORER™, OPERA™, etc. to access and interact with the framework 110. In one embodiment, the clients 102 issue requests to web servers 112 and receive web pages, for display in a web browser run on the clients 102. In one embodiment, the web pages include collaboration interfaces 160 with real-time web components of the framework 110. In one embodiment, client 102 utilizes collaboration interface 160 to interact with other clients (not shown) in order to receive mentoring on a specific topic, such as debugging software, editing images, editing documents, etc.

Framework 110 is responsible for providing interactive and real-time web applications, such as framework widgets 120 and applications 128, to clients 102 in response to web page requests issued by user systems. In one embodiment, the framework 110 leverages an open source web framework, such as PYTHON™ for deploying and integrating the various framework components discussed herein. In one embodiment, as will be discussed in greater detail below, framework widgets are self-contained live web applications updated in real-time and embedded in requested web page content. In one embodiment, the framework widgets are updated and perform various functions in the clients 102 in real time without requiring that additional requests and response be issued by the clients 102 and without requiring additional encoding of web content to make such requests. Examples of framework widgets include, but are not limited to, real-time acquisition and display of data feeds (e.g., news feeds from CNN, technical literature feeds, etc.), graphical user interface applications (e.g., graphs updated in real time), instant messaging, system resource monitoring, software update monitoring and notification, collaborative editing of a document with other users, communication between instances of framework widgets, communication between client computer systems, games, real time stock tickers, etc.

In one embodiment, web servers 112 of the framework 110 include one or more server computer systems that execute applications in a web stack (not shown). In one embodiment, the web servers are Web Server Gateway Interface (WSGI) servers that stack a plurality of web applications to build a web stack. In one embodiment, the web stack is a grouping of applications or layers that deliver a web solution (such as a graphical user interface system, enterprise system, framework 110, etc.). In one embodiment, the web application stack is a set of software applications run on the server 112 to support the development and deployment of websites, web applications, web services, and collaborations. One example of a web application stack that may be managed by web servers 112 is PYTHON™. PYTHON™ is a collection of packages or software modules that enable developers to write web applications or services without having to handle such low-level details as protocols, process/thread management, etc.

In one embodiment, the web servers 112 include a plurality of server computer systems coupled together for collectively processing the web applications stack and implementing the framework 110 discussed herein. In one embodiment, the web servers 112 also include computer systems (not shown) that are remote from web servers 112 and communicate over a network, such as network 104. In one embodiment, the web application stack includes web application layers such as authentication layer(s), authorization layer(s), caching layer(s), application or resource injection layer(s), etc.

In one embodiment, the web servers 112 receive requests from a clients 102 for non-framework web applications and web pages. Such requests are simply passed through the framework 110 to the corresponding requested external resource(s) 140. When the external resources 140 respond to the user system request, the framework forwards the requested content to the client 102. In another embodiment, the external resources 140 transmit the requested content directly to the requesting client bypassing the framework 110. In one embodiment, the client 102 connects and communicates to the external resources 140 through a framework proxy. In one embodiment, there is a bi-directional connection between the client 102 and the external resources 140 via proxies 126. In one embodiment, the external resources 140 communicate with the framework middleware 114 via web servers 112. In one embodiment, external resources 140 may further transmit messages to the message broker 116, for message distribution discussed below, if framework 110 exposes the message broker 116 to external resources 140.

In one embodiment, the framework 110 includes framework middleware 114. Although framework middleware 114 is illustrated outside the web servers 112, in one embodiment, the framework middleware 114 is one of the layers in the web application stack managed and executed by the web servers 112. Framework middleware 114 is one or more computer applications that connects software components or applications run in web servers 112. In one embodiment, the middleware consists of a set of services that allows multiple processes of the web applications stack running on one or more machines to interact, provide a web applications framework (such as framework 110), etc.

In one embodiment, framework middleware 112 may be used with existing web server applications. For example, framework middleware 12 may be added to an existing middleware application in a web application stack, such as a web stack including TURBOGEARS™ middleware that consists of several WSGI components such as PYLONS™, SQLALCHEMY™, GENSHI™, and REPOZE™. In one embodiment, the framework middleware 112 may be run by web servers 112 as a standalone platform for implementing the framework 110 as well as other middleware. In one embodiment, the standalone middleware stack includes application modules for profiling, resource compression, application dispatch/routing, session management, caching, widget resource injection, authentication, authorization, transaction management, error handling, registry management, and user supplied applications.

In one embodiment, the framework 110 includes framework widgets 120, applications 128, and collaboration collections 170. In one embodiment, a framework widget is a reusable web component or class that bundles one or more of CSS, stylesheets, JAVASCRIPT® technology, HTML, XML, etc. code to provide a live graphical user interface element and/or web application that can be updated in real-time without intervention of a client. In one embodiment, a collection of framework widgets 120 are included or embedded within a web page, including a collaboration interface 160, requested by clients 102 and supplied by the framework 110. In one embodiment, as discussed below, different collaboration interfaces may be selected and supplied to client 102. In one embodiment, the different collaboration interfaces include different collections of framework widgets 120. For example, a collaboration for debugging a software application would include a different set of collaboration framework widgets than a collaboration for editing an image. In one embodiment, collaboration collections 170 database stores data, such as universal resource indicators, definitions of framework widgets, sample data, and presentation data, etc., that indicate what framework widgets are inserted into specific collaboration interfaces.

In one embodiment, when a framework widget 120 is delivered to a web page, framework middleware 114 injects framework socket 150 into the client 102. In one embodiment, the framework socket 150 is JAVASCRIPT™ code that connects to proxies 126. In one embodiment, the connection is a live (i.e., continuously open) communications pathway between the framework socket 150 opened within a web browser run on client 102 and the proxies 126 of the framework 110. In one embodiment, the live connection via the framework socket enables live data to be delivered directly to clients 102 without any additional actions performed by a web page displayed by client 102. In one embodiment, proxy 126 may reside on a dedicated machine or be part of web servers 112.

In one embodiment, the proxies 126 are proxies that provide a JavaScript® HTML socket, such as framework socket 150, in the clients 102. In one embodiment, the live connection provided by framework socket 150 enables execution of real-time collaborations that include features such as chat rooms, instant messaging, live graphs, live document editing, live image editing, voice over internet protocol communication, etc., without using any external plug-ins like the Adobe® FLASH® technology or JAVA® technology. In one embodiment, when a web page is loaded by a client 102, the framework socket 150 is opened automatically by the framework middleware 114 and connects, via the proxies 126, to a message broker 116.

In one embodiment, proxies 126 are a transport layer to enable the real-time exchange of data between the user systems 102 and message broker 116. In one embodiment, the proxies 126 are implemented as COMET SESSION PROTOCOL™ (CSP) proxies. In one embodiment, proxies 126 are a transport layer of framework 110 in which protocols can flow through. More specifically, the proxies 126 include a group of methods and protocols within a layered architecture of network components, within which the proxies 126 are responsible for encapsulating and translating between communications protocols application data blocks into data units (datagrams, segments) suitable for transfer to the framework infrastructure. In one embodiment, the proxies 126 are responsible for translating and communicating data from the clients 102, regardless of the web browser and corresponding supported protocols that are being used by the browser 102, for transmission to the message broker 116. In one embodiment, the proxies 126 are also responsible for managing the reverse transaction by abstracting network datagrams and delivering their payload to framework widgets run in a web browser on a user system 102. Examples of transport protocols supported by the proxies are TCP/IP, UDP, or implementations of web browser-targeted bi-directional stream-based protocols, such as CSP.

In one embodiment, the message broker 116 is run on a server and is responsible for receiving, storing, and routing messages to and from clients 102. In one embodiment, the message broker 116 may include multiple message brokers that route data messages in different protocols or formats, such as advanced message queuing protocol (AMQP) and streaming text oriented messaging protocol (STOMP). In one embodiment, proxies 126 also support the AMQP and STOMP messaging protocols, and therefore translate between the data messages sent by the message brokers before receipt by the clients 102. STOMP is a text protocol designed to work with message oriented middleware. STOMP provides an interoperable wire format that enables STOMP clients to talk with STOMP message brokers. In one embodiment, the hub 124 also supports the AMQP and STOMP messaging protocols, and therefore enables translation between the data messages sent by the message brokers 116. In one embodiment, the hub 124 also translates after the applications 128 send messages, thus abstracting the underlying message protocol and delivery mechanisms from an application author.

In one embodiment, the message broker 116 runs on a web server computer 112. However, in one embodiment, message broker 116 could run on its own server computer system, a computer system remote from framework 110, a computer system that is deployed on a different framework, etc. In one embodiment, the data transport protocols supported by the proxies 126 enable a user's web browser to communicate with the message broker 116 in whatever protocol is supported by the user system. For example, in embodiments, the proxies 126 support the communications protocols of INTERNET EXPLORER™, FIREFOX™, OPERA™, etc., and the different communications methods supported by each.

In one embodiment, proxies 126 provide protocol translation between clients 102 and the message broker 116. User web browsers run by clients 102 communicate via protocols implemented in JAVASCRIPT™ through the framework socket 150. In one embodiment, the framework socket 150 is an abstraction of the TCP socket in the proxies 126. In one embodiment, the framework socket 150 is also an abstraction of a TCP socket in JAVASCRIPT™ on a web browser run by a client 102. In one embodiment, clients 102 communicate utilizing the framework socket 150, via the proxies 126, to the message broker 116. In one embodiment, the framework socket 150 determines what web browser it is communicating with and opens an appropriate socket type to the proxies 126 to ensure a best level of communication possible, ensure that the framework socket remains live and open for as long as possible, etc. In one embodiment, the opening of a socket and establishing a link with the proxies 126 is transparent to a user, and the user does not know the socket is being opened.

In one embodiment, when framework widgets 120 are provided and rendered in a collaboration interface 160, each framework widget 120 registers with the framework middleware 114 as it passes through the framework 110 and prior to delivery to client 102. In one embodiment, the first framework widget to successfully establish a framework socket, as discussed above, provides the socket to the other framework widgets. For example, if there are three framework widgets in a web page that includes a collaboration interface 160, a first framework widget to render a framework socket on the requested web page would share the framework socket, so that each framework widget could communicate with the message broker 116 via the single framework socket. In one embodiment, the framework widget could also handle setting up and using the framework socket 150 behind the scenes, allowing the framework 110, as an API, to hide any necessary knowledge of the framework socket 150 from a developer of the framework widget.

In one embodiment, framework socket 150 connects with the proxies 126. In one embodiment, the framework widgets 120 register callback functions, to be processed by each framework widget, with the middleware 114. In one embodiment, the framework socket 150 then renders the pre-registered callbacks in JAVASCRIPT™, and sends the callbacks back clients 102. Thus, the framework widgets 120 are already registered with the framework socket 150 when the client 102 runs the response. In one embodiment, the callbacks are JAVASCRIPT™ functions that process messages received by the message broker 116. Once connected in the client 102, the callbacks for a framework widget are executed by the framework sockets 150 when appropriate (e.g., when a data message is received by a framework widget which triggers a callback function).

In one embodiment, framework widgets 120 subscribe to topics that the framework widget wants to "listen" to. In one embodiment, a topic is an abstraction of a message queue. Thus, a framework widget with a subscription to a topic might include, for example, a framework widget that receives data for a collaboration corresponding to a particular news feed, displays a graph updated in real-time, receives comments from a mentor client, etc. When messages are received at the message broker 116 for a topic (e.g., data arrives at a message queue for distribution by the message broker), the data is sent by the message broker 116 via the proxies 126 to the framework sockets 150. In one embodiment, the framework sockets 150 correspond to framework widgets that have registered their subscription to the topic with the message broker 116. In one embodiment, the framework sockets 150 locally route, within a client 102, received data messages to the particular framework widgets 120 that subscribe to the data. In one embodiment, the web browser executes JAVASCRIPT™ code run by the framework socket 150 on behalf of the widget to route the received data messages.

For example, when a message arrives at the message broker 116, the message broker 116 sends the message through the proxies 116 to the web browsers 102 run on user systems. In one embodiment, the framework widgets 120 within a web page subscribe to the message queues for certain topics. The message broker 116 is responsible for routing the messages to the appropriate subscribers. Once a message is received by a client 102, the framework socket 150 distributes the message to each framework widget in the collaboration interface with a corresponding subscription for the message. In other words, the framework socket 150 performs browser-side routing of messages, whereas the message broker 116 performs server-side routing of data messages to subscribers.

In one embodiment, the framework 110 supports various configurable message flows (e.g., STOMP, AMQP, etc.), allowing the framework 110 and framework widgets 120 to utilize various message brokers configured by different messaging protocols. In one embodiment, the different protocol based messaging flows may be utilized by framework 110 at the same time, depending on an environment in which the framework is deployed.

In one embodiment, the hub 124 is a plug-in driven reactor that resides outside of the web servers 112. The word reactor may also be thought of as a main event loop in an application. In one embodiment, the hub 124 has numerous plug-in applications, such as framework widgets 120 and/or applications 128. In one embodiment, the plug-in applications 128 may be producer or consumer applications.

A producer application is one that creates data. In one embodiment, a producer may be a polling producer. In one embodiment, the polling producer is implemented as a JAVA™ class that specifies certain polling functions (i.e., wake up every minute, get data every two minutes, transmit new data to message broker). The producer might define a poll method. In one embodiment, the hub 124 would then, based on the code, start the producer according to the requirements of the producer. If there are new message entries obtained by the producer method, the producer sends the message to the message broker 116. The producers (as well as the consumers) have connections to the message broker 116 that are utilized to send and receive messages with the message broker 116. The hub 124 is responsible for obtaining and distributing messages, churning on data, etc. as required by the plug-in applications 128 installed on the hub 124. The message broker 116 is responsible for routing the messages to appropriate client 102 rendering framework widgets with subscriptions to the topic for which the data message belongs.

A consumer application is one that handles or transforms data. For example, a consumer, which may be implemented as a JAVA™ class, consumes/subscribes to a topic and calls/executes a method when a message for that consumer arrives. In one embodiment, the hub 124 routes the message to the appropriate consumer.

In one embodiment, the hub 124 sits outside the web server 112. In one embodiment, the hub 124 exists on a separate server computer system to provide data processing for the applications 128. By processing data, running producer and consumer applications, etc. outside the web servers 112, the hub applications do not consume web server 112 resources. Furthermore, as discussed herein, the hub 124 obtains and transmits data messages without requiring actions on behalf of a user system (e.g., user web page request). Thus, the hub 124 also makes the framework-based web applications more efficient on the browser side by minimizing browser initiated requests and responses.

In one embodiment, the hub 124 further provides expert system-like functionality by providing applications programming interfaces (APIs) for interacting with a variety of knowledge bases (SQLALCHEMY™ models, resource connectors, caches, message queues, etc), creating framework widgets, and monitoring and processing incoming data. One could then easily build state-machines, inference engines, forward/backward-chaining rule-driven expert systems, etc.

In one embodiment, the framework widgets 120 are managed by the framework middleware 114 and the and the applications 128 are managed by the hub 124. In one embodiment, the framework middleware 114 loads the widgets 120 and applications 128 from storage of server computer systems of the framework 110. In one embodiment, when a collaboration application, such as applications 128 that launch collaboration interface 160 are to be integrated into the framework 110, the new plug-in application can be installed or plugged in anywhere on hub 124 utilizing a framework entry point. In one embodiment, the framework middleware 114 locates and finds the widgets and applications upon startup, and loads the applications that have been registered at the entry points. Thus, with the framework 110, any plug-in can be installed as separate packages on the system utilizing package installation methods such as RPM™ package management of RED HAT™. In one embodiment, the framework middleware 114 can also locate and use widgets and/or applications located externally to the framework 110, such as applications of the external resources 140. In one embodiment, the framework middleware 114 utilizes entry point registration of the external widgets and/or applications to locate and load the appropriate applications and framework widgets.

In one embodiment, framework middleware 112 also loads applications, such as applications 128 or framework widgets 120, In one embodiment, framework middleware 112 further loads, mounts, and exposes existing TURBOGEARS™, PYLONS™, or SWGI-compatible applications. Thus, various additional applications can be plugged into framework 110. In one embodiment, framework 110 can expose all installed applications via a link (e.g., via a universal resource locator such as /apps/myapp), and further make the applications available to pull in additional framework widgets for user in framework-based web applications, graphical user interface dashboards, framework widgets, etc.

In one embodiment, the framework 110 further includes a cache memory 122 and databases 118. In one embodiment, the cache memory 122 is a temporary memory that may be used and accessed by the hub 122 and the live widgets 120. In one embodiment, the databases 118 may be utilized by applications installed on the framework 110. In one embodiment, applications can specify a particular database, from databases 118, to be used by the app. If no database is installed or selected, in one embodiment, the framework middleware 114 will create a database for the application.

As discussed above, the framework provides a highly scalable platform for creating collaboration interfaces embedded in web pages that include live/real-time framework widgets. Furthermore, because the framework sockets, proxies, and framework middleware provide protocol abstractions and protocol translation abilities, the framework makes it simple for framework widgets to extract and extend data from arbitrary resources in an intuitive and efficient manner. In the embodiments discussed above, the framework incorporates various components such as PYTHON™, ORBITED™, AMQP, WSGI, etc. Framework applications may be written using stable pre-existing modules for these components, which can be either exposed on the framework or provided via other means, to enable the rapid creation of powerful applications utilizing framework widgets. Furthermore, the framework widgets, when combined with the hub and message broker(s) enable services to create, publish, and subscribe to arbitrary message streams.

In order to more fully explain the framework 110 and architecture for providing real-time web applications, discussed above, embodiments of system work flows are discussed in greater detail below with respect to FIGS. 2-4.

Figure 2:
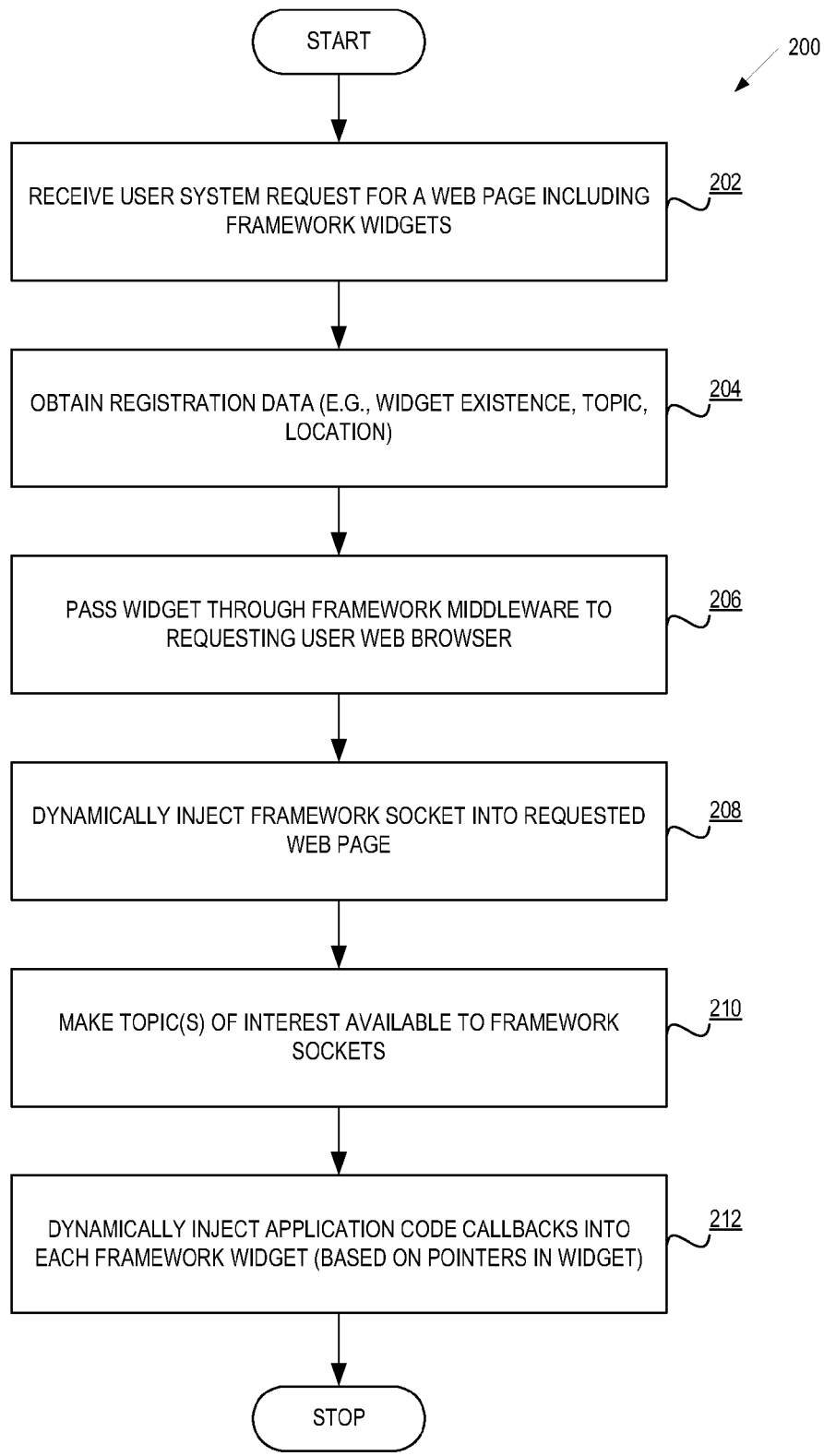
FIG. 2 is a flow diagram of one embodiment of a method for providing a web page including a framework widget registered with a real-time web application framework.

FIG. 2 is a flow diagram of one embodiment of a method 200 for providing a web page including a framework widget registered with a real-time web application framework. The method 200 is performed by processing logic that may comprise hardware (circuitry, dedicated logic, etc.), software (such as is run on a general purpose computer system or a dedicated machine), firmware, or a combination. In one embodiment, the method 200 is performed by a real-time web application framework (e.g., framework 110).

Referring to FIG. 2, the process begins by receiving a user system web browser request at web server 110 for a web page including a collaboration interface with a collection of framework widgets 120 (processing block 202). In one embodiment, the request is a normal web page request received by web servers 112. In another embodiment, the request includes data that indicates a user's subject-matter interest for potential collaborations. As will be discussed below, specific collaboration interfaces include different collections of framework widgets depending on a user's determined subject of interest and that subject's collaboration interface.

In one embodiment, framework middleware 114 obtains registration data (e.g., widget existence, topic subscriptions, location) corresponding to framework widgets 120 of the determined collaboration that are to be rendered in a web page (processing block 204). In one embodiment, framework 110 finds all framework widgets for a collaboration by consulting a collaboration collections 170 database, and renders them on web servers 112 into HTML, JAVASCRIPT™, CSS, etc. along with the rest of the requested web page including a collaboration interface 160.

Web servers 112 pass the framework widgets 120 through the framework middleware 114 to the requesting client 102 (processing block 206).

Framework middleware 114 dynamically injects a framework socket 150 into requested web page (processing block 208). In one embodiment, the framework socket is a live socket that abstracts the TCP protocol and opens a connection with framework proxies, such as proxies 126. In one embodiment, the connection is a persistent connection between the clients 102 and message broker 116. In one embodiment, the framework widgets 120 register their existence with framework middleware 114 before the framework socket 150 is injected into the web page. The framework socket 150 then uses the framework widget 120 registration information when rendering itself.

Framework middleware 114 makes topics of interest available to the framework sockets 150 (processing block 210). In one embodiment, the framework middleware 114 makes the data available to the framework sockets 150 when the framework sockets 150 are rendering.

Framework middleware 114 dynamically injects application code callbacks into each framework widget (processing block 212). In one embodiment, as discussed in greater detail below, framework widgets include pointers to callback functions. In one embodiment, a callback function is a snippet of JAVASCRIPT™ code that performs additional processing on a received data message. For example, a framework widget that is to display a list of feeds received from a news site, may receive feed data and then execute callbacks which prepend the new data to a feed list, animates the display of the new feed, highlights the new feed, etc. In one embodiment, the framework widget includes pointers to the callback functions to be executed by the framework widget, and processing logic utilizes these pointers to locate and dynamically inject the callbacks into the framework widget as it is delivered to a client. In one embodiment, the callback code is stored within the framework. In another embodiment, the callback bode is stored in a location remote from the framework.

Figure 3:
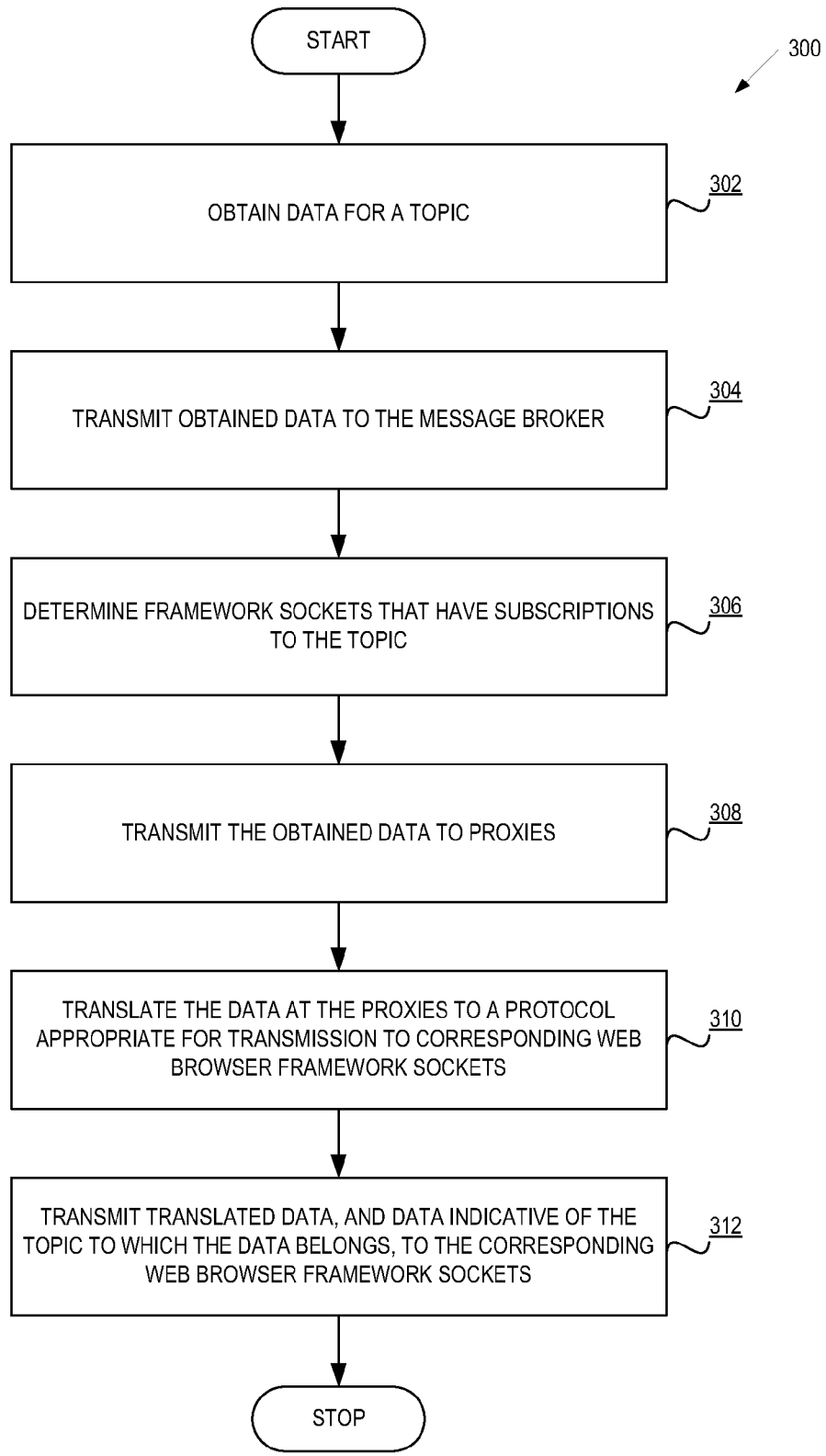
FIG. 3 is a flow diagram of one embodiment of a method for a real-time web application framework obtaining and distributing messages to clients.

FIG. 3 is a flow diagram of one embodiment of a method 300 for a real-time web application framework obtaining and distributing messages to clients. The method 300 is performed by processing logic that may comprise hardware (circuitry, dedicated logic, etc.), software (such as is run on a general purpose computer system or a dedicated machine), firmware, or a combination. In one embodiment, the method 300 is performed by a real-time web application framework (e.g., framework 110).

Referring to FIG. 3, the process begins by an application 128 run by the hub 124 obtaining data for a topic (processing block 302). As discussed above, a topic is an abstraction of a messaging queue. In one embodiment, the application is a producer application that is loaded and run by the hub according to configuration parameters of the application. For example, the producer application may specify that it is to be run every N minutes in order to check for new data for a particular topic. The application would then be awoken by the hub to pole a data source for new data. When new data is available, the application obtains the data for distribution via the framework.

The application 128 run in the hub 124 transmits the obtained data to a message broker (processing block 304). In one embodiment, the application run on the hub transmits newly acquired data to the hub as the data becomes available. In one embodiment, the message broker may be a STOMP protocol-based message broker, an AMQP protocol-based message broker, or any other type of message broker. Furthermore, processing logic may be configured to communicate with various message brokers according to various communications protocols. In one embodiment, processing logic translates the data message to a format appropriate for the intended message broker.

The message broker 116 determine framework sockets that have subscriptions to the topic (processing block 306). In one embodiment, the message broker determines what framework sockets, and thus web browsers, should receive the data based on framework widget subscriptions. As discussed above, the topic subscriptions are registered with the framework and passed to the message broker when a framework widget is provided to a web browser in a requested web page. In one embodiment, the message broker may then use the subscriptions to determine where to send newly received data messages, the recipient framework socket connection, etc.

Message broker 116 transmits the obtained data to proxies 126 (processing block 308). In one embodiment, the message broker 116 transmits the data messages to the proxies 126 when the proxies 126 has an open connection established with the message broker 116. Furthermore, in one embodiment, the message broker 116 transmits the message when a corresponding framework socket 150 has subscribed to a topic that the message is for.

The proxies 126 then translates the data to a protocol appropriate for transmission to corresponding web browser framework sockets (processing block 310). In one embodiment, the proxies 126 create socket connections between the clients 102 and the message broker 116. In one embodiment, the proxies 126 encapsulates data messages sent between the message broker 116 and the clients 102 in a protocol for transmission to and from the browser.

In one embodiment, the proxies translate the message from a STOMP or AMQP protocol formatted message to a communications protocol supported by a receiving web browser, such as a FIREFOX™, INTERNET EXPLORER™, OPERA™, etc. web browser. In another embodiment, the proxies may not need to translate the data prior to transmission to a web browser. In one embodiment, protocol translation can be handled by a framework socket.

Proxies 126 transmit the translated data, and data indicative of the topic to which the data belongs, to the corresponding framework sockets 150 (processing block 312). In one embodiment, proxies 126 establish a raw connection between clients 102 and external resources 140. In another embodiment, proxies 126 utilize the subscriptions, registered with the framework and known to the message broker, to determine what framework widgets rendered in clients and have subscriptions to the topic corresponding to the data message. That is, for example, a data message may be ready for transmission to all framework widgets that have corresponding topic subscriptions. Note that different framework widgets (e.g., a real-time graph widget, a news feed widget, a dashboard widget, etc.) may all have subscriptions to the same topic even though the widgets themselves are different and execute potentially different callback functions. In one embodiment, the proxies utilize the subscription data registered with the framework to send the data messages to the appropriate clients for each of the framework widgets with an appropriate topic subscription.

Figure 4:
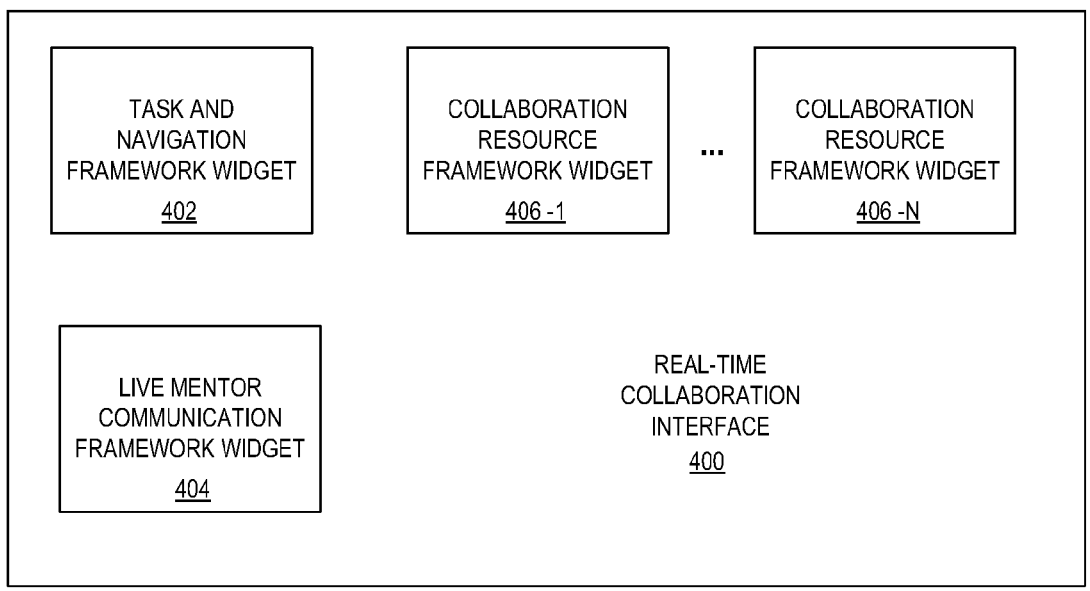
FIG. 4 illustrates one embodiment of a block diagram for a real-time collaboration interface.

FIG. 4 illustrates one embodiment of a block diagram for a real-time collaboration interface 400. In one embodiment, real-time collaboration interface 400 is a collection of framework widgets, which includes a task and navigation framework widget 402, live mentor communication framework widget 404, and one or more collaboration resource framework widgets, such as collaboration resource framework widget 406-1 through collaboration resource framework widgets 406-N. There may be more or less framework widgets included in a live collaboration interface, as collaboration interfaces for different subject matters (e.g., bug triage, image editing, document sharing, etc.) may include different sets of framework widgets, as discussed in greater detail below.

In one embodiment, real-time collaboration interface 400 includes a task and navigation framework widget 402. In one embodiment, the task and navigation framework widget 402 may itself include one or more widgets that enables a client to navigate between data such as a user collaboration account or user preferences associated with the user collaboration account (e.g., user interface theme, profile settings, etc.). In one embodiment, the user collaboration account is maintained by framework 110 and stored in database(s) 118.

In one embodiment, task and navigation framework widget 402 may further include one or more links to static web pages that are associated with real-time collaboration interface 400. In one embodiment, user selection of such a link would launch a web page in a collaboration resource framework widget 406-k. In one embodiment, the web page is loaded within the real-time collaboration interface 400 to prevent the attention and focus of a user of the interface to be diverted to an entirely separate interface, different application, or otherwise unnecessarily interrupted.

In one embodiment, the task and navigation framework widget 402 may also include exit and/or cleanup functions. In one embodiment, the task and navigation framework widget 402 enables a user of the real-time collaboration interface 400 to close the interface 400 or exit an existing collaboration session.

In one embodiment, real-time collaboration interface 400 also includes a live-mentor communication framework widget 404. In one embodiment, the live mentor communication framework widget 404 is a widget that enables bi-direction real-time communication with a mentor. In one embodiment, live mentor communication framework widget 404 may provide internet relay chat (IRC) messaging, instant messaging, voice over IP, etc. to enable a user of the real-time collaboration interface 400 to interact with a mentor. In one embodiment, the mentor-mentee relationship enables a mentor (e.g., a user skilled in the subject matter of a particular collaboration) to provide real-time guidance, via chat, voice, etc. communications channels, to a user/mentee utilizing the real-time collaboration interface 400.

In one embodiment, in response to a client 102 launching real-time collaboration interface 400, live mentor communication framework widget 404 alerts other users that a new collaboration for the subject matter of interface 400 has begun. In one embodiment, the alert indicates to the other users that mentoring on the subject matter of the real-time collaboration interface 400 is desired.

For example, a user who is a novice at bug triage for software systems may start a bug triage collaboration interface. As discussed herein, a message is transmitted to registered mentor-users (e.g., users registered as mentors for a specific collaboration topic with real-time application framework 110). Live mentor communication framework widget may then receive and post communication with the mentor-users via the real-time application framework 110. In one embodiment, the mentor-users also engages in a collaboration in a real-time collaboration interface. However, because real-time collaboration framework provides protocol translation and real-time messaging services, mentor-user may participate in a collaboration simply by responding to the real-time collaboration interface in the format of the live mentor communication widget 404 (e.g., the mentor may response to a live mentor communication chat widget widget with a standard chat client). That is, a mentor-user and a user utilizing the real-time collaboration interface, may engage in collaboration utilizing instant messaging although only the mentee-user is utilizing the real-time collaboration interface.

In one embodiment, real-time collaboration interface includes a collection of collaboration resource framework widgets, such as framework widgets 406-1 through 406-N. In one embodiment, the collaboration resource framework widgets 406 provide one or more views of data, each view providing data fed from one or more sources, relevant to a particular subject matter of a collaboration. In one embodiment, the grouping of collaboration resource framework widgets 406 is a default grouping of resource widgets as specified in a collaboration collections 170 database. For example, for a bug triage real-time collaboration interface 400, the default grouping of resource widgets may include a live update widget that supplies data from an issue tracker that shows the results of collaborative bug triage. As another example, for a real-time collaboration interface 400 for maintainers and packagers of software, the default grouping of resource widgets may include a live update widget that provides outputs of logs for current code compilations and a widget displaying a package building process. As yet another example, for a real-time collaboration interface 400 for software testers, the default grouping of resource widgets may include an image feed that displays a remote system on which manual or automated tests are being performed. For a writing and programming collaboration interface 400, the default collection of widgets may include a connection to an editor product to enable collaborative editing (e.g., OBBY™ or INFINOTE™ editors).

In one embodiment, the data views provided by collaboration resource framework widgets 406 may be dynamic and live-updated as a user interacts with the collaboration resource framework widget 406. Furthermore, in one embodiment, other resources, such as electronic mail applications, web browsers, help databases etc. may also be includes within default groupings of resource widgets. In one embodiment, a collection of collaboration resource framework widgets, for example an issue tracker widget and an email application widget, are selected to provide a user of the collaboration interface 400 a sufficient number of resources so that the user does not have to leave the live collaboration interface 400 to perform task related to the collaboration. That is, a user may send emails, check an issue tracker, chat with a mentor-user, etc. all within the real-time collaboration interface 400. As a result, a user's attention is not diverted to extraneous applications or processes.

Figure 8:
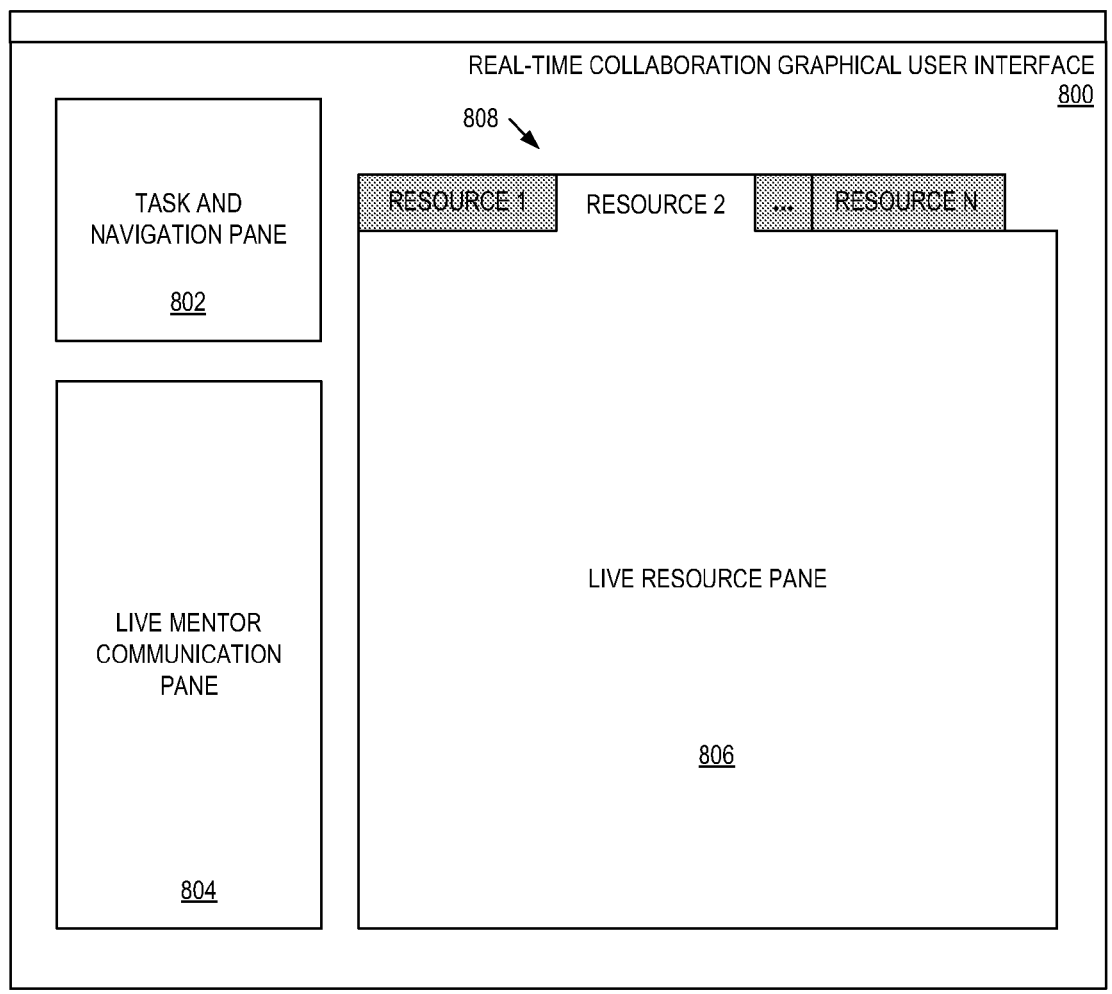
FIG. 8 illustrates an exemplary graphical user interface for the real-time collaboration interface.

FIG. 8 illustrates an exemplary graphical user interface 800 for the real-time collaboration interface 400 of FIG. 4, according to one embodiment. In one embodiment, the graphical user interface 800 includes a task and navigation pane 802, live mentor communication pane 804, and a live resource pane 806. In one embodiment each of the panes corresponds to the framework widgets 402-406 discussed above. In the graphical user interface 800, a plurality of resources, such as the resources provided by collaboration resource framework widgets 406, utilize tabs to raise or lower specific resource panes into view of the graphical user interface 800. Other forms of interactive control may also be utilized in a graphical user interface for selecting resource panes. In one embodiment, graphical user interface 800 may also include dynamic resource pane updates, to visually indicate to a user of the graphical user interface 800 that data has changed in a resource pane.

Figure 5:
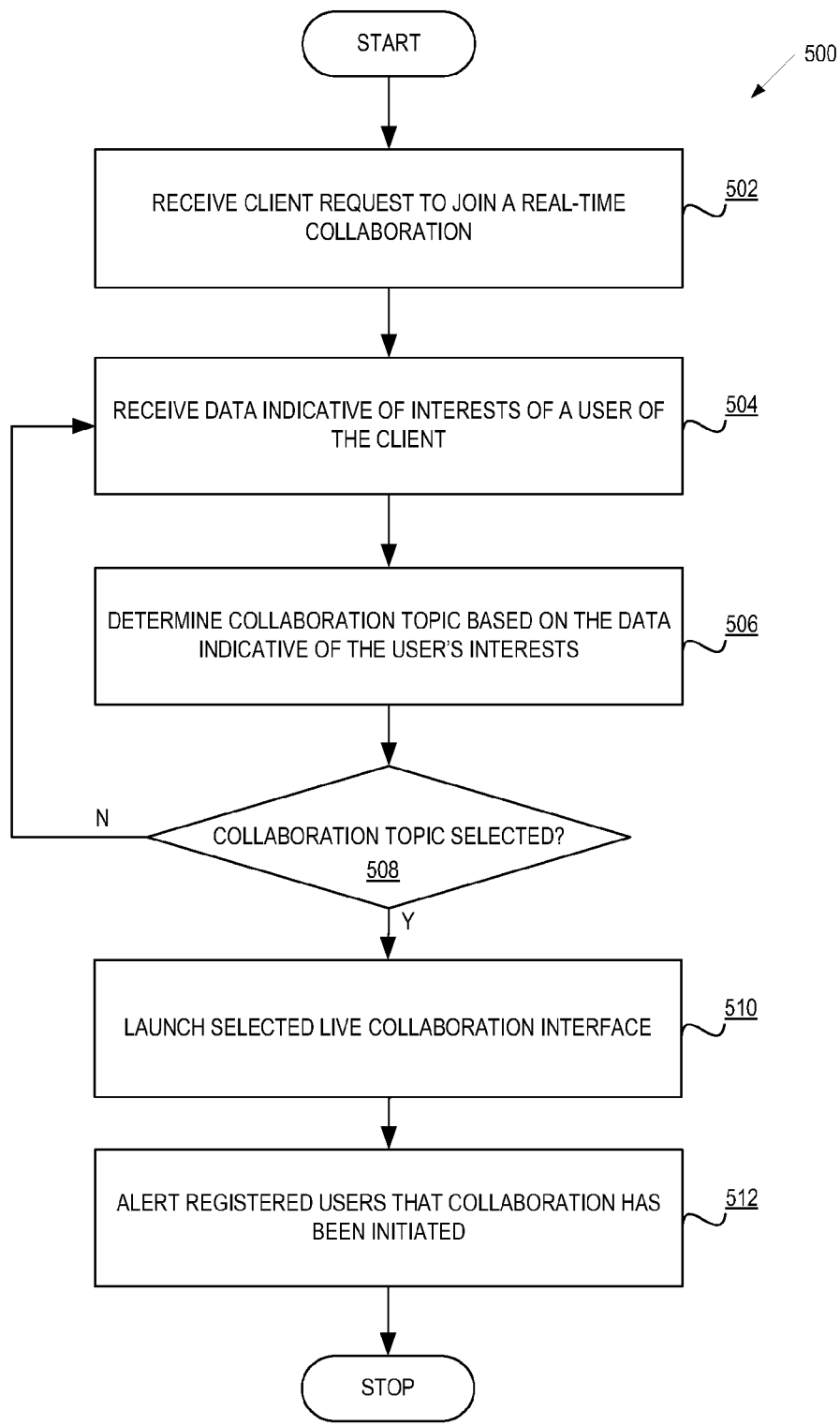
FIG. 5 is a flow diagram of one embodiment of a method for launching a real-time collaboration interface.

FIG. 5 is a flow diagram of one embodiment of a method 500 for launching a real-time collaboration interface. The method 500 is performed by processing logic that may comprise hardware (circuitry, dedicated logic, etc.), software (such as is run on a general purpose computer system or a dedicated machine), firmware, or a combination. In one embodiment, the method 500 is performed by a real-time web application framework (e.g., framework 110).

Referring to FIG. 5, the process begins with receiving a client request to join a real-time collaboration (processing block 502). In one embodiment, the request is received via a web page application for starting collaborations. In one embodiment, the web page is a web page maintained by a real-time application framework 110.

Processing logic receives data indicative of interests of a user of the client (processing block 504). In one embodiment, the interests may indicate a user's interests in areas such as bug triage, software maintenance, software testing, programming, system administration. Furthermore, the interests may include data that reveals a user's experience level, time commitment, technical background, etc.

A collaboration topic is then determined based on the data indicative of the user interests (processing block 506). In one embodiment, the task is selected based on the data collected about the user to provide potential collaborations that will appeal to the user's interest, their background, experience level, etc. In one embodiment, selection of a particular collaboration is performed in a manner similar to that described in U.S. patent application Ser. No. 12/350,152, filed Jan. 7, 2009, entitled "Automated Task Delegation Based on Skills," whose disclosure is incorporated by reference herein.

Processing logic determines whether the selected collaboration topic has been accepted by a user (processing block 508). When the selected topic has not been accepted, processing logic returns to processing block 504 to receiving new or additional user interests, or changes to the user's interests. Based on the new and/or changed interests new potential collaboration topics may be selected for the user.

When the collaboration topic is selected by the user, processing logic launches the real-time collaboration interface (processing block 510). Processing logic further alerts registered users that the collaboration has been initiated (processing block 512). In one embodiment, the alert may be an alert that a new collaboration has been started. In another embodiment, the alert may be an alert that a new user has joined an existing collaboration. In either case, mentors are alerted to a new user that desires guidance for a particular subject.

Figure 6:
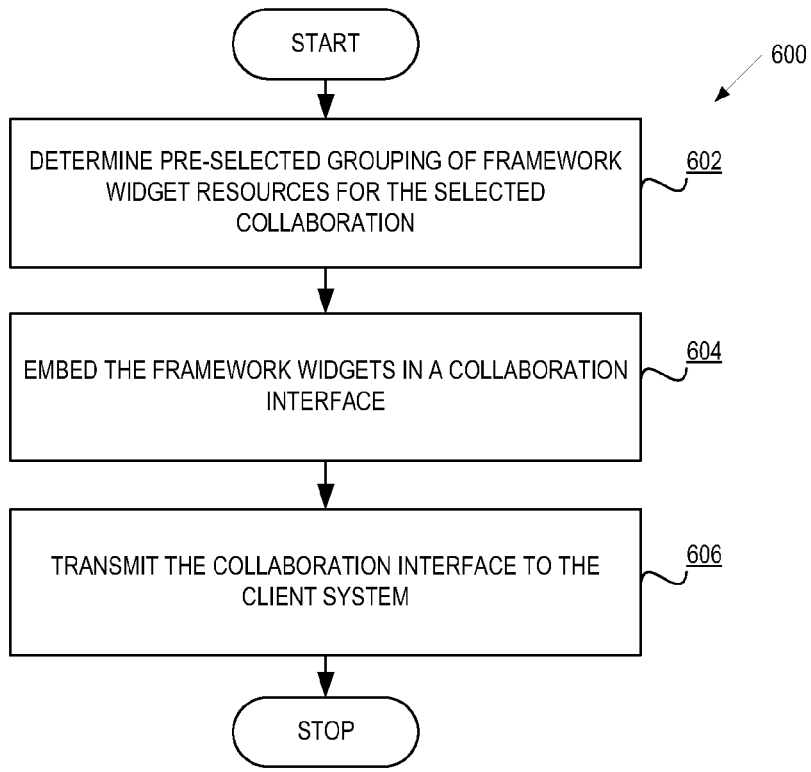
FIG. 6 is a flow diagram of one embodiment of a method for providing a real-time collaboration interface to a client.

FIG. 6 is a flow diagram of one embodiment of a method 600 for providing a real-time collaboration interface to a client. The method 600 is performed by processing logic that may comprise hardware (circuitry, dedicated logic, etc.), software (such as is run on a general purpose computer system or a dedicated machine), firmware, or a combination. In one embodiment, the method 600 is performed by a real-time web application framework (e.g., framework 110).

Referring to FIG. 6, the process begins by determining a pre-selected grouping of framework widget resources for a selected collaboration (processing block 602). As discussed above, a specific collaboration interface, selected based on a user's interests, is determined for a user of a client computer system. In one embodiment, based on the chosen collaboration interface, a collaborations collection 170 database may be accessed. As discussed above, the collaborations collection 170 database stores data indicating a collection of framework widgets 120 associated with a specific collaboration interface. For example, collaborations collection 170 database may store data indicating that a real-time collaboration interface for software programmers is associated with a resource widget and provides a software editing product. As another example, the collaborations collection 170 database may store data indicating that a real-time collaboration interface for a system administrator is associated with resource widgets that display live update feeds for loads, as well as widgets that display live updates for other system activities, for one or more active systems.

Processing logic embeds the framework widgets in a collaboration interface (processing block 604). In one embodiment, the resource framework widgets are embedded in a web page that provides a user interface for interacting with the resource framework widgets. FIG. 8 illustrates an exemplary embodiment of a graphical user interface that may be provided as a collaboration web application of the real-time application framework 110. The collaboration interface, with the embedded resource framework widgets, is transmitted to the client system (processing block 606).

Figure 7:
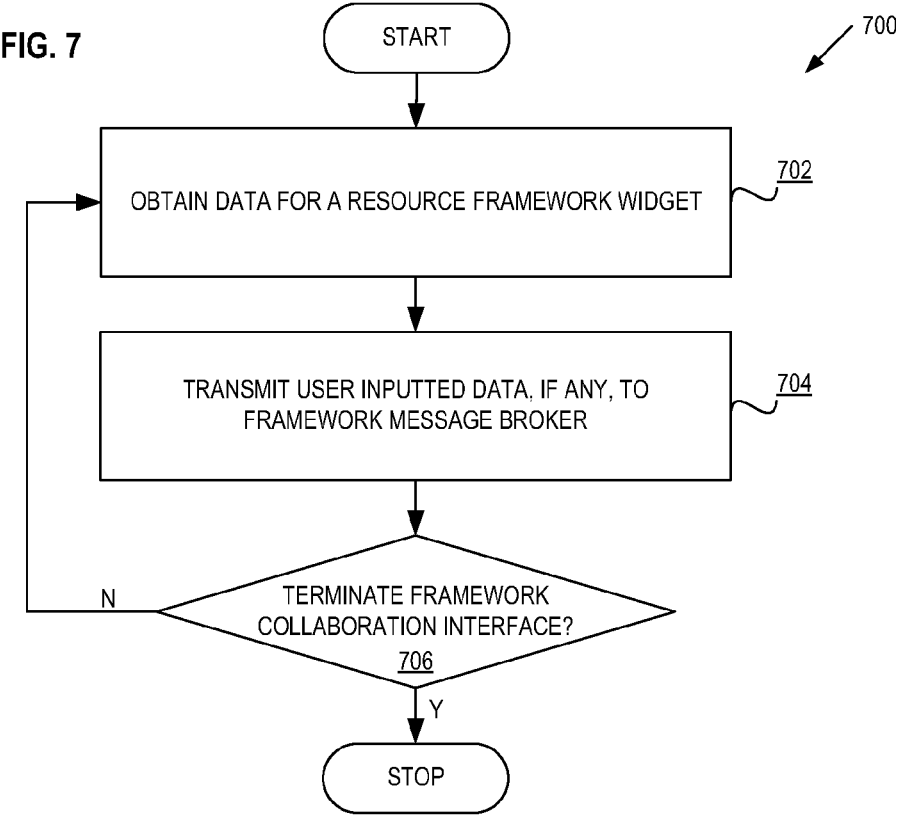
FIG. 7 is a flow diagram of one embodiment of a method for updating a real-time collaboration interface.

FIG. 7 is a flow diagram of one embodiment of a method 700 for updating a real-time collaboration interface. The method 700 is performed by processing logic that may comprise hardware (circuitry, dedicated logic, etc.), software (such as is run on a general purpose computer system or a dedicated machine), firmware, or a combination. In one embodiment, the method 600 is performed by a real-time collaboration interface including a framework widgets (e.g., real-time collaboration interface 400).

Referring to FIG. 7, the process begins by obtaining data for a resource framework widget (processing block 702). As discussed above, the resource framework widgets are connected with a message broker 116 of the real-time application framework 110. The message broker 116 processes data in real-time and supply updates to the framework widgets. Thus, a real-time collaboration interface, with embedded framework widgets, is updated in real-time as messages are supplied by the message broker 116. For example, a system administrator collaboration interface would receive updated load data for active systems as the data is fed to the real-time application framework 110. As a result, the system administrator collaboration interface could display up to date data refreshed in real time.

Processing logic further transmits user inputted data, if any, to a message broker of the real-time application framework (processing block 704). Because resource framework widgets include interactive framework widgets (i.e., electronic mail widgets, a web browsing widget, a widget the allows setting user preferences, etc.), processing logic transmits user initiated updates to the real-time application framework 110.

Processing logic determines whether a command to terminate a framework collaboration interface has been received (processing block 706). As long as no command has been received, processing logic continues to obtain data for resource framework widgets, as well as transmitting user inputted data to the real-time application framework 110.

Figure 9:
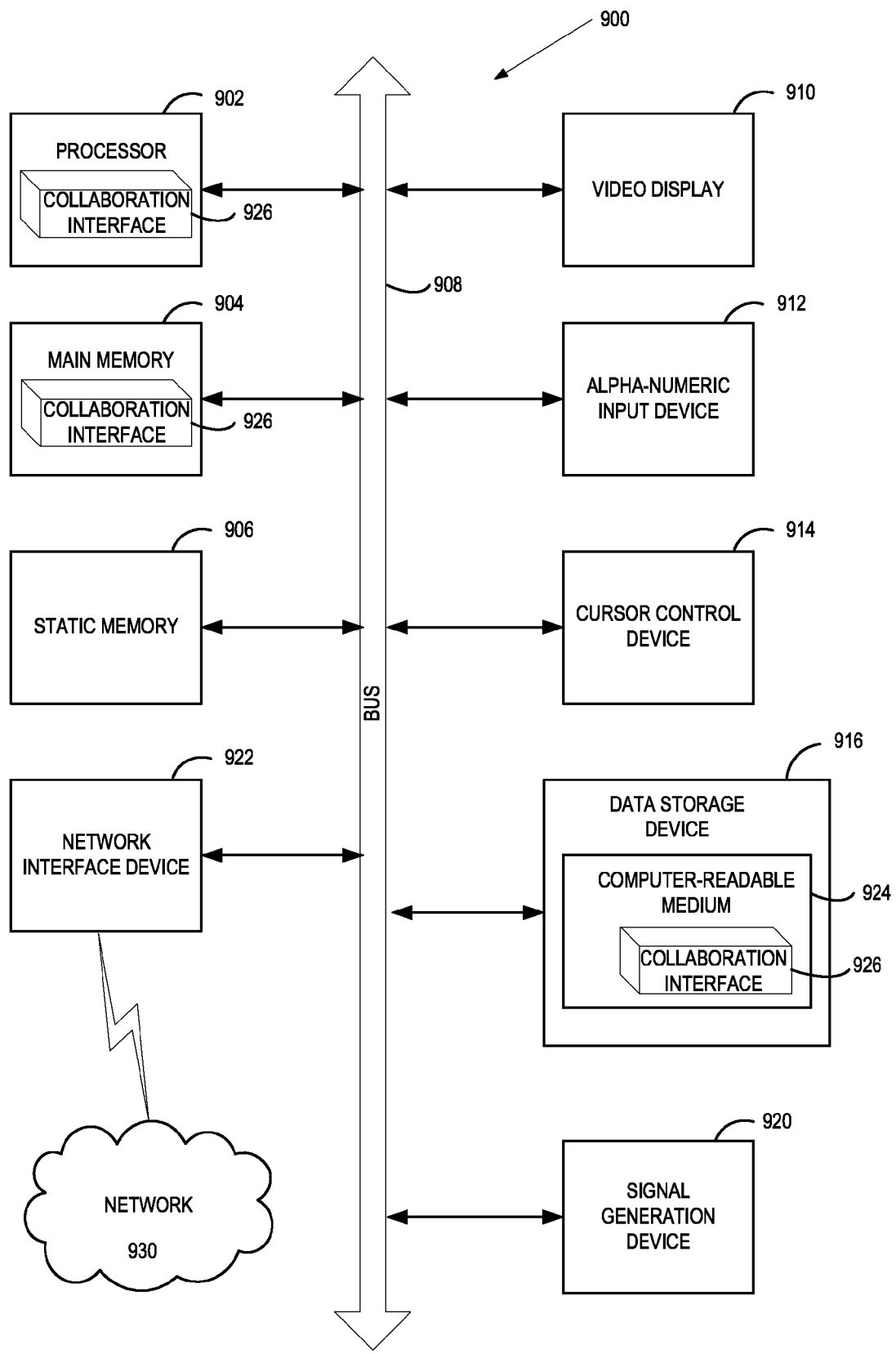
FIG. 9 illustrates a diagrammatic representation of a machine in the exemplary form of a computer system.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device (processor) 902, a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.), and a data storage device 916, which communicate with each other via a bus 908.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute the processing logic 926 for performing the operations and steps discussed herein.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 916 may include a computer readable medium 916 on which is stored one or more sets of instructions (e.g., collaboration interface 926) embodying any one or more of the methodologies or functions described herein. The collaboration interface 926 may also reside, completely or at least partially, within the main memory 904 and/or within the processor 902 during execution thereof by the computer system 900, the main memory 904 and the processor 902 also constituting computer-readable media. The collaboration interface 926 may further be transmitted or received over a network 930 via the network interface device 922.

While the computer readable medium 924 is shown in an exemplary embodiment to be a single medium, the term "computer readable storage medium" should be taken to include a single medium or multiple media (e.g., a centralized or distributed database, and/or associated caches and servers) that store the one or more sets of instructions. The term "computer readable medium" shall also be taken to include any medium that is capable of storing, encoding or carrying a set of instructions for execution by the machine and that cause the machine to perform any one or more of the methodologies of the present invention. The term "computer readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receive", "determine", "launch", "alert", "embed", "transmit", "obtain", "terminate", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A method comprising:
receiving a request at framework middleware to initiate a collaboration on a particular subject from a client computing system, wherein the framework middleware is to provide a web-based application framework;
analyzing data indicative of the particular subject in the request by the framework middleware;
selecting, by the framework middleware, a collection of framework widgets in view of the analyzing without requiring an action of the client computing system, wherein at least one of the collection of framework widgets is a web-based component that is updated as updates to data of the web-based component become available;
embedding, with a computing system, the collection of framework widgets in a collaboration interface;
presenting a web page comprising the collaboration interface to the client computing system; and
opening a framework socket in the client computing system by the framework middleware to enable the web-based application framework to send data messages to the collection of framework widgets without receiving additional requests from the client computing system, wherein the framework socket opens a persistent connection between the client computing system and the web-based application framework while the web page is being displayed by client computing system.

2. The method of claim 1, further comprising:
transmitting the collaboration interface with the embedded collection of framework widgets to the client computing system that initiated the request; and
transmitting an alert message to one or more mentors associated with the particular subject.

3. The method of claim 2, further comprising:
receiving user input from one of the collection of framework widgets; and
distributing the user input, with the web-based application framework, to one or more users engaged in the collaboration.

4. The method of claim 2, wherein the collaboration interface is a web-based interface to be run by a web browser of the client computing system.

5. The method of claim 1, wherein the collection of framework widgets is a pre-selected group of framework widgets associated with the particular subject.

6. The method of claim 5, further comprising
consulting a database of framework widget collections to determine the pre-selected group of framework widgets, the database storing a plurality of different pre-selected groups of framework widgets, each of the different pre-selected groups associated with a different subject.

7. The method of claim 1, wherein a framework widget is updated as data is obtained by the web-based application framework from a data feed associated with the framework widget.

8. The method of claim 1, wherein the collection of framework widgets comprises two or more collaboration resource framework widgets, each collaboration resource framework widget to display data fed from one or more sources and relevant to the particular subject.

9. The method of claim 1, wherein the collection of framework widgets comprises a communication framework widget that enables bi-directional communication between a user of the collaboration interface and one or more mentors.

10. A non-transitory, tangible computer readable storage medium that provides instructions, which when executed on a processing device cause the processing device to perform operations comprising:
receiving a request at a framework middleware to initiate a collaboration on a particular subject from a client computing system, wherein the framework middleware is to provide a web-based application framework;
analyzing data indicative of the particular subject in the request by the framework middleware;
selecting, by the framework middleware, a collection of framework widgets in view of the analyzing without requiring an action of the client computing system, wherein at least one of the collection of framework widgets is a web-based component that is updated as updates to data of the web-based component become available;
embedding, with a computing system, the collection of framework widgets in a collaboration interface;
presenting a web page comprising the collaboration interface to the client computing system; and
opening a framework socket in the client computing system by the framework middleware to enable the web-based application framework to send data messages to the collection of framework widgets without receiving additional requests from the client computing system, wherein the framework socket opens a persistent connection between the client computing system and the web-based application framework while the web page is being displayed by client computing system.

11. The computer readable storage medium of claim 10, further comprising:
transmitting the collaboration interface with the embedded collection of framework widgets to a client computing system that initiated the request; and transmitting an alert message to one or more mentors associated with the particular subject.

12. The computer readable storage medium of claim 11, further comprising:
   receiving user input from one of the collection of framework widgets; and
   distributing the user input, with the web-based application framework, to one or more users engaged in the collaboration.

13. The computer readable storage medium of claim 11, wherein the collaboration interface is a web-based interface to be run by a web browser of the client computing system.

14. The computer readable storage medium of claim 10, wherein the collection of framework widgets is a pre-selected group of framework widgets associated with the particular subject.

15. The computer readable storage medium of claim 14, further comprising
   consulting a database of framework widget collections to determine the pre-selected group of framework widgets, the database storing a plurality of different pre-selected groups of framework widgets, each of the different pre-selected groups associated with a different subject.

16. The computer readable storage medium of claim 10, wherein a framework widget is updated as data is obtained by the web-based application framework from a data feed associated with the framework widget.

17. The computer readable storage medium of claim 10, wherein the collection of framework widgets comprises two or more collaboration resource framework widgets, each collaboration resource framework widget to display data fed from one or more sources and relevant to the particular subject.

18. The computer readable storage medium of claim 10, wherein the collection of framework widgets comprises a communication framework widget that enables bi-directional communication between a user of the collaboration interface and one or more mentors.

19. A system comprising:
   a memory to store data indicating a plurality of collections of framework widgets; and
   a processing device coupled with the memory to execute framework middleware to provide a web-based application framework, wherein the framework middleware is to:
      receive a request to initiate a collaboration on a particular subject from a client computing system,
      analyze data indicative of the particular subject in the request,
      select a collection of framework widgets from the plurality of collections without requiring an action of the client computing system, wherein the selection is in view of the based on the analyzed data, and wherein at least one of the collection of framework widgets is a web-based component that is updated as updates to data of the web-based component become available,
      embed the collection of framework widgets in a collaboration interface,
      present a web page comprising the collaboration interface to the client computing system, and
      open a framework socket in the client computing system to enable the web-based application framework to send data messages to the collection of framework widgets without receiving additional requests from the client computing system, wherein the framework socket is to open a persistent connection between the client computing system and the web-based application framework while the web page is being displayed by client computing system.

20. The system of claim 19, wherein the collection of framework widgets comprises two or more collaboration resource framework widgets, each collaboration resource framework widget to display data fed from one or more sources and relevant to the particular subject.

* * * * *